United States Patent Office 2,837,459
Patented June 3, 1958

2,837,459

METHOD OF AND COMPOSITION FOR PRESERVING MILK AND MILK PRODUCTS

Burdet Heinemann, Springfield, Mo., assignor to Eco, Incorporated, Kansas City, Mo., a corporation of Missouri No Drawing. Application July 12, 1954
Serial No. 442,920

2 Claims. (Cl. 167—19)

This invention relates to the preservation of milk and milk products generally, particularly in the dairy industry wherein it often times becomes desirable or necessary to prevent curdling or spoilage of the milk for a considerable period of time prior to conducting the usual tests for butterfat content and the like.

The Babcock test is widely used in the dairy industry as a method for determining butterfat content of milk. Samples of milk which are purchased or sold may be tested while fresh or may be preserved by chemicals, refrigeration, or both for testing at a later time. The latter practice is customary in many parts of this country when buying milk at creameries, cheese and evaporated milk plants. Under these conditions, samples are taken from daily deliveries and collected in one bottle over a period of five to sixteen days. In order for these samples to be suitable for testing by the Babcock test at the end of the period of compositing, cool storage temperatures and chemical preservatives are necessary.

It is accordingly the most important object of the instant invention to provide an economical, easily handled preservative preferably in a tablet form for preserving milk samples for a period of at least sixteen days without substantially changing the characteristics of the samples from bacteriological (staining ability), butterfat or total solids standpoints.

A further object of this invention is to provide a preservative for milk samples that is appreciably less toxic than preservatives heretofore placed in common use on a weight-to-weight basis and particularly mercuric chloride, one of the most common preservatives now in extensive use.

A still further object of this invention is to provide a chemical combination of ingredients which is capable of compression into tablets of comparatively small size for convenience in dispensing into bottles to which milk will subsequently be added.

Another important object of this invention is the provision of a method of preserving milk that contemplates using an admixture of active ingredients which, when added to and therefore, dissolved in the milk to be preserved, produce a reaction such as to appreciably increase the length of time the milk is preserved thereby and which appreciably reduces the amount of certain critical materials commonly used today and which are relatively expensive on the open market.

The two preservatives in common use are mercuric chloride and 36% formaldehyde solution. Mercuric chloride is corrosive to metals and highly toxic, but can be compressed into tablets for convenient usage. Formaldehyde solution is not as toxic, but, being a liquid, must be added by means of an eye dropper, pipette, or similar device. Furthermore, the amount of formaldehyde used (usually 2 drops per fluid ounce of milk), while not interfering with the Babcock test, does prolong the mixing of milk and sulphuric acid while performing the test.

Since either a mercuric chloride tablet weighing 6 to 8 grains, or formaldehyde in the concentrations generally used, do act as diluents, the gross amount of preservative should be as small as possible, yet have adequate preserving power.

In the past, other preservatives have been mentioned in the literature on the subject. These are borax, salicyclic acid, copper ammonium sulphate, potassium permanganate, ammonium hydroxide, and sodium hydroxide. For various reasons, none of these are in common use.

In developing the instant invention and making the discoveries hereinafter outlined, I tested as many as fifty compounds which appeared to have possibilities in meeting my objectives. A large majority of these were rejected because of (1) extreme toxicity, (2) insolubility in milk, (3) lack of adequate preserving power, (4) interference with the Babcock test, (5) interference with the direct microscopic count for bacterial estimates, and (6) the inability of the material to be formed into tablets.

It was found, for example, that mercuric oxycyanide is a suitable milk preservative. However, upon the addition of sulphuric acid to the preserved milk, small quantities of hydrogen cyanide are liberated. It was also found, as another example, that phenyl mercuric acetate has preserving powers which are limited by the solubility of this compound. Sulfanilamide is an example of a compound which does not possess adequate preserving power. Sodium sulphite reacts violently with sulphuric acid if present in the milk in sufficient quantities to preserve it. Mercuric chloride (when required quantities are used) interferes with the staining of milk films when preserved samples are used for making direct microscopic count for bacterial estimates. Sodium oxide is suitable for preserving milk but the compression of this substance into tablet form is dangerous since it is explosive. Potassium dichromate (when used in required quantities), hardens the casein of the milk and prolongs the mixing of sulphuric acid and milk.

Notwithstanding the adverse results of my tests and experiments with the above ingredients, particularly with respect to the various soluble mercury compounds when used alone as preservatives, and the various soluble chromates, I have discovered that an excellent preservative can be produced when properly using a soluble compound of mercury in combination with a suitable oxidizing compound, such as potassium chlorate, iodate or permanganate; ceric sulphate or ammonium nitrato cerate; or a soluble metalic chromate. Whereas, each of these classes of ingredients when used alone, or even successively, are incapable of producing any better results than have heretofore been taught in this field, when the same are first admixed and thereupon dissolved simultaneously in the milk, a reaction takes place such as to increase the period of preservation, all with an appreciably lesser amount of active ingredients, thereby not only decreasing the cost but decreasing the amount of critical materials in the composition.

The mercury compound found to be most suitable for the above purposes is mercuric chloride although many other mercurial salts may be used with the oxidizing compound, depending upon the desired results. By the same token, there are many soluble chromates which may be used with greater or lesser degrees of success in conjunction with mercuric chloride but I have found that such oxidizing compounds as potassium dichromate or potassium iodate are most suitable.

In carrying out the method of this invention it is to be preferred that the aforesaid potassium and mercurial salts be first admixed, preferably in equal amounts and thereupon dissolved in the milk to be preserved. Still further, since these two ingredients are readily adapted for tableting, as above-mentioned, it is to be preferred that the same be so formed into tablets prior to dissolving the same in the milk. Manifestly, therefore, the finished tablet will contain many inert ingredients in addition to the active salts, such as coloring material, fillers, binders, and/or lubricants adapting the powders for tableting. Samples of milk so preserved may, thereafter be tested for butterfat or total solids, for making bacterial estimates by the direct microscopic count method, and for other purposes.

The usual quantities of mercuric chloride used to date in preserving milk range from between 0.2 and 0.3 gram in 8 ounces of milk. Such proportions normally preserve the milk at room temperature from two to three weeks.

I have found also that substantially the same results can be attained through use of the same amount of potassium dichromate in 8 ounces of milk.

However, when these two chemicals are combined, as above set forth, the amount of each needed to preserve the same amount of milk for at least three weeks, is approximately one-tenth of that needed when the ingredients are used separately. Thus, aproximately 0.03 gram of mercuric chloride first admixed with substantially the same amount of potassium dichromate and thereupon dissolved in 8 ounces of milk, will preserve the latter for a full three weeks. Such milk, when tested for bacteria count by the direct microscopic count method, yields reliable results for at least one week from the day of preservation.

By way of comparison, if 8 ounces of milk were preserved with only 0.03 gram of mercuric chloride such preservation would last for only about four days. The same amount of potassium dichromate in 8 ounces of milk will provide for only a four day preservation.

Accordingly, it has been found that a mixture of from 10 to 300 milligrams of a suitable chromate with from 10 to 300 milligrams of a suitable organic or inorganic mercury compound will preserve up to 200 milliliters of milk for at least sixteen days and during such period of preservation the milk may be tested by either the Babcock test or the direct microscopic count method.

Furthermore, a mixture of one part potassium dichromate and one part of mercuric chloride provides a suitable preservative for 10,000 parts of milk for analytical purposes.

There is presently on the market a commonly used tablet weighing from 7½ to 8 grains and containing from 46.7% to 50% mercuric chloride. It can readily be appreciated that because of the scarcity of mercury, particularly during wartime, and the expensive nature thereof, a preservative tablet of that nature is not entirely satisfactory. On the other hand, through use of the ingredients above-mentioned it is possible to produce a 4 grain tablet containing 11.6% mercuric chloride and 11.6% potassium dichromate capable of preserving 8 ounces of milk for at least two weeks. The time of preservation may be increased simply by increasing the size of the tablet. For example, an 8 grain tablet containing 11.6% of mercuric chloride and 11.6% of bichromate of potash will preserve 8 ounces of milk for as long as four weeks.

In addition to the foregoing, it is not to be overlooked that the combination of these two important active ingredients into a single tablet not only produces better results, but provides a product that is safe to handle because of greatly reduced toxicity.

Having thus described the invention, what is claimed as new and desired to be secured by Letters Patent is:

1. A method of treating an inedible laboratory test sample of milk to preserve the same for from two to four weeks for subsequent testing to determine butter fat content, total solids and direct bacteria count, said method comprising the step of adding to said milk from 10 to 300 milligrams of mercuric chloride and from 10 to 300 milligrams of a milk-soluble oxidizing compound selected from the group consisting of potassium chlorate, potassium dichromate, potassium permanganate, potassium iodate, ceric sulfate, and ammonium nitratocerate for each 200 milliliters of the milk.

2. A method of treating an inedible laboratory test sample of milk to preserve the same for from two to four weeks for subsequent testing to determine butter fat content, total solids and direct bacteria count, said method comprising the step of adding to said milk from 0.03 to 0.2 gram of mercuric chloride and from 0.03 to 0.2 gram of potassium dichromate.

References Cited in the file of this patent

UNITED STATES PATENTS

| | | |
|---|---|---|
| 1,393,282 | Grindrod | Oct. 11, 1921 |
| 2,554,944 | Ferrari, Jr. | May 29, 1951 |